United States Patent [19]
Cho

[11] Patent Number: 5,740,975
[45] Date of Patent: Apr. 21, 1998

[54] FISHING REEL DRAG MECHANISM

[75] Inventor: Won Hang Cho, Seoul, Rep. of Korea

[73] Assignee: Johnson Worldwide Associates, Inc., Sturtevant, Wis.

[21] Appl. No.: 782,954

[22] Filed: Jan. 13, 1997

[51] Int. Cl.[6] ............................................ A01K 89/027
[52] U.S. Cl. .................................................... 242/244
[58] Field of Search ............................... 242/244, 246

[56] References Cited

U.S. PATENT DOCUMENTS

| | | |
|---|---|---|
| 3,023,978 | 3/1962 | Denison et al. |
| 3,061,230 | 10/1962 | Gayle . |
| 3,198,456 | 8/1965 | Wood . |
| 3,794,264 | 2/1974 | Hull . |
| 4,408,729 | 10/1983 | Moss et al. |
| 4,431,143 | 2/1984 | Moss et al. |
| 4,664,330 | 5/1987 | Darden . |
| 4,674,698 | 6/1987 | Carpenter ................ 242/244 |
| 4,778,120 | 10/1988 | Finney et al. ............. 242/244 |
| 4,796,828 | 1/1989 | Councilman . |
| 4,878,633 | 11/1989 | Morimoto . |
| 4,930,722 | 6/1990 | Toda . |
| 5,040,743 | 8/1991 | Zurcher et al. |
| 5,071,086 | 12/1991 | Roberts et al. |
| 5,100,079 | 3/1992 | Toda . |
| 5,108,042 | 4/1992 | Puryear et al. |
| 5,118,048 | 6/1992 | Childre et al. |
| 5,118,049 | 6/1992 | Roberts et al. |
| 5,145,125 | 9/1992 | Morimoto . |
| 5,149,008 | 9/1992 | Oi . |
| 5,149,009 | 9/1992 | Sato . |
| 5,192,036 | 3/1993 | Sato . |
| 5,197,690 | 3/1993 | Hlava . |
| 5,244,165 | 9/1993 | Valentine et al. |
| 5,259,565 | 11/1993 | Hitomi . |
| 5,265,824 | 11/1993 | Sato . |
| 5,297,756 | 3/1994 | Ikuta . |
| 5,348,245 | 9/1994 | Sugawara . |
| 5,393,004 | 2/1995 | Weaver et al. |
| 5,427,325 | 6/1995 | Weaver . |
| 5,518,193 | 5/1996 | Kirby ..................... 242/244 |

*Primary Examiner*—Katherine Matecki
*Attorney, Agent, or Firm*—Foley & Lardner

[57] ABSTRACT

A drag mechanism for a spin casting reel operated by a star wheel coaxial with and located behind the reel handle. The adjustment of the star wheel transmitted through a cam having a spiral groove engaged by a cam follower to a lever arm which applies an axial braking force to braking disks coaxial with the reel spool.

20 Claims, 4 Drawing Sheets

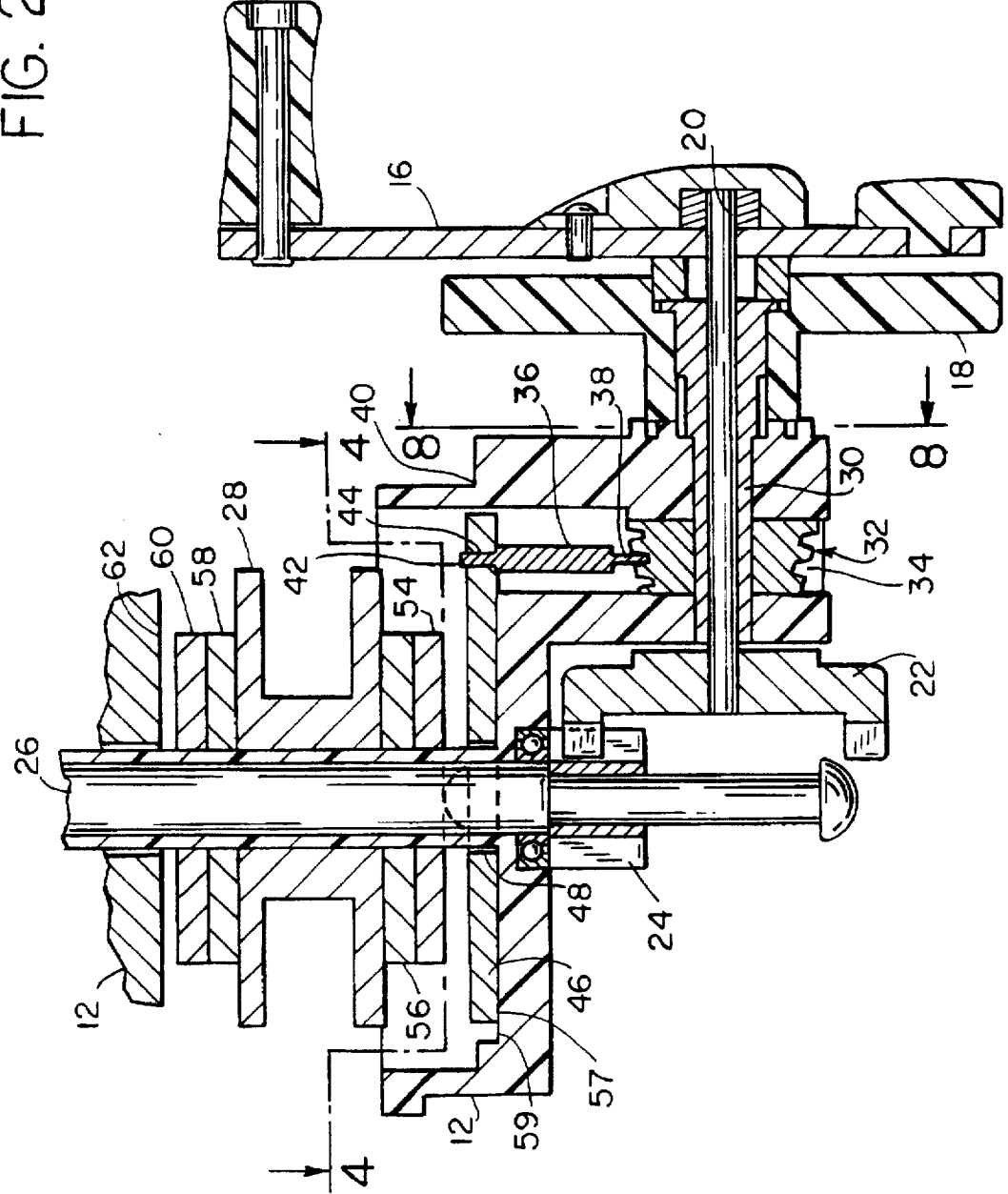

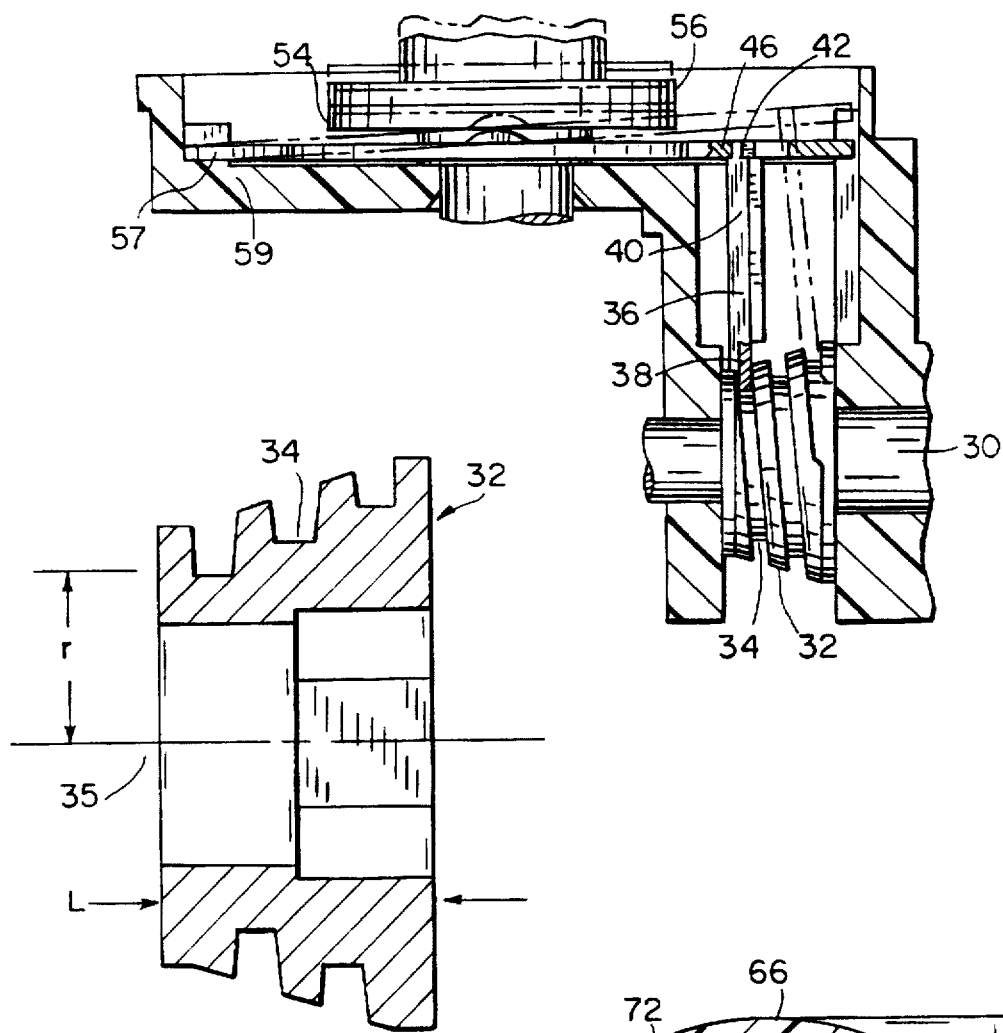
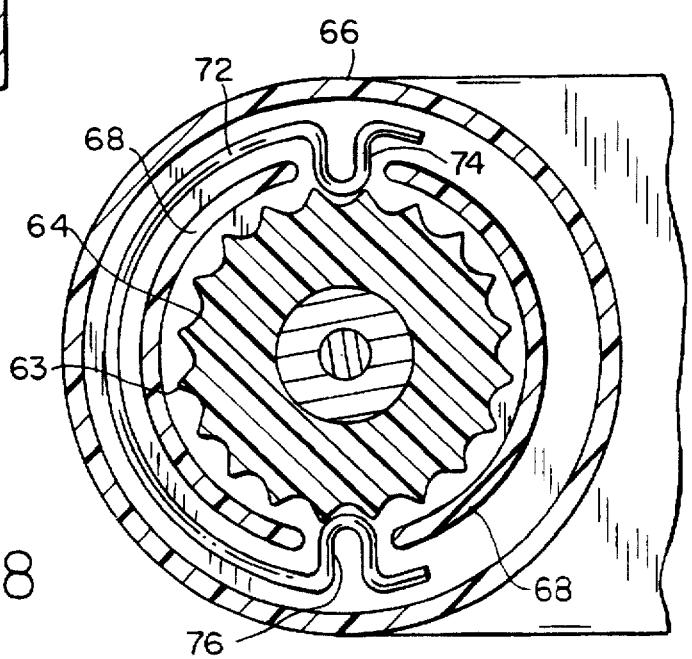
FIG. 6
FIG. 7
FIG. 8

FISHING REEL DRAG MECHANISM

BACKGROUND OF THE INVENTION

I. Field of the Invention

This invention relates to fishing reels and more particularly to spin casting reels. Such reels are frequently provided with a drag mechanism to resist turning of the reel upon which the line is wound. The drag is typically provided by drag washers, which may be provided on opposite sides of the reel, with a variable axial pressure applied to the drag washers to provide the desired amount of drag on the spool. A star wheel is often provided for manually adjusting the amount of drag applied to the reel by the drag mechanism.

II. Description of Related Art Including Information Disclosed Under Sections 1.97 and 1.98

Spin casting reels with various types of drag mechanisms have been provided in the past. Some of those mechanisms are described in the following patents.

| U.S. Patent No. | Inventor(s) |
| --- | --- |
| 3,023,978 | Denison et al. |
| 3,061,230 | Gayle |
| 3,794,264 | Hull |
| 4,408,729 | Moss et al. |
| 4,431,143 | Moss et al. |
| 4,664,330 | Darden |
| 5,149,009 | Sato |
| 5,192,036 | Sato |
| 5,197,690 | Hlava |
| 5,244,165 | Valentine et al. |
| 5,393,004 | Weaver et al. |

The Darden and Moss et al. patents set forth drag mechanisms which are adjusted by a star wheel. The rotation of the star wheel turns a threaded member which axially displaces a lever arm extending perpendicular to the axis of the star wheel and threaded member with respect to the axis of the star wheel and threaded member. Movement of the lever arm applies a drag force to drag washers coaxial with the reel spool. The Hull and Weaver et al. patents show drag mechanisms, adjustable by a star wheel, which apply a drag force to a gear driving the spool. The Hlava and Weaver patents depict drag mechanisms in which a threaded member is axially displaced by rotation of a knob connected thereto to pivot a lever to apply a variable drag force to the spool of a reel. The Sato patents set forth drag mechanisms which include a V-shaped spring associated with a star drag wheel and a click barrel to provide a detent and clicking noise when the star wheel is rotated to adjust the drag. Still other drag mechanisms are revealed by the Denison et al., Gayle and Valentine et al. patents.

While the patents set forth above illustrate various drag mechanisms, some of which are adjusted by a star wheel, and some of which include a clicking mechanism, further simplification and improvement in the construction and operation of such drag mechanisms is desirable. There is particularly a new for an improved reel wherein a drag force applied to the spool is adjusted by a star wheel, with a clicking or detent action and sound being provided when the position of the star wheel is adjusted.

SUMMARY OF THE INVENTION

It is an object of this invention to provide a star wheel adjusted drag mechanism for a spin casting reel, which is effective in operation and of simplified construction. It is another object of this invention to provide a clicking or detent mechanism of simplified construction the action of which a user will feel when rotating the star wheel and which also provides an audible clicking noise.

In accordance with this invention, a drag mechanism for a spin casting reel is provided in which a manually rotatable member in the form of a star wheel is connected to rotate a rotatable cam having an axially extending spiral groove formed therein. The radial depth of the groove changes from one end of the groove to the other. An elongated cam follower has a first end which rests in the groove and a second end which projects radially away from the rotatable cam. An elongated lever arm is pivotally supported at one end on the frame of the reel, with the other end being engaged by the second end of the cam follower. The elongated lever arm is positioned such that as the cam is rotated by the star wheel to move the second end of the cam follower radially outwardly, a portion of the arm engages and applies an axial force to at least one braking disk associated with the spool of the reel to apply a drag to the spool. Greater radially outward movement of the cam follower applies an increasing axial force to the at least one braking disk to apply increasing drag to the spool. Embossments are provided on a central portion of the lever arm to engage and apply the axial force to the at least one braking disk.

BRIEF DESCRIPTION OF THE DRAWINGS

FIG. 2 is a partial cross-sectional view taken along the line 2—2 in FIG. 1 showing the drag mechanism of FIG. 1;

FIG. 6 is a partial top view of the drag mechanism;

FIG. 7 is a cross-sectional view of the drag gear of the drag mechanism; and

FIG. 8 is a cross-section taken along the line 8—8 in FIG. 2 to show the detent and click mechanism incorporated in the drag mechanism.

DETAILED DESCRIPTION OF THE PREFERRED EMBODIMENT

Figure 1:
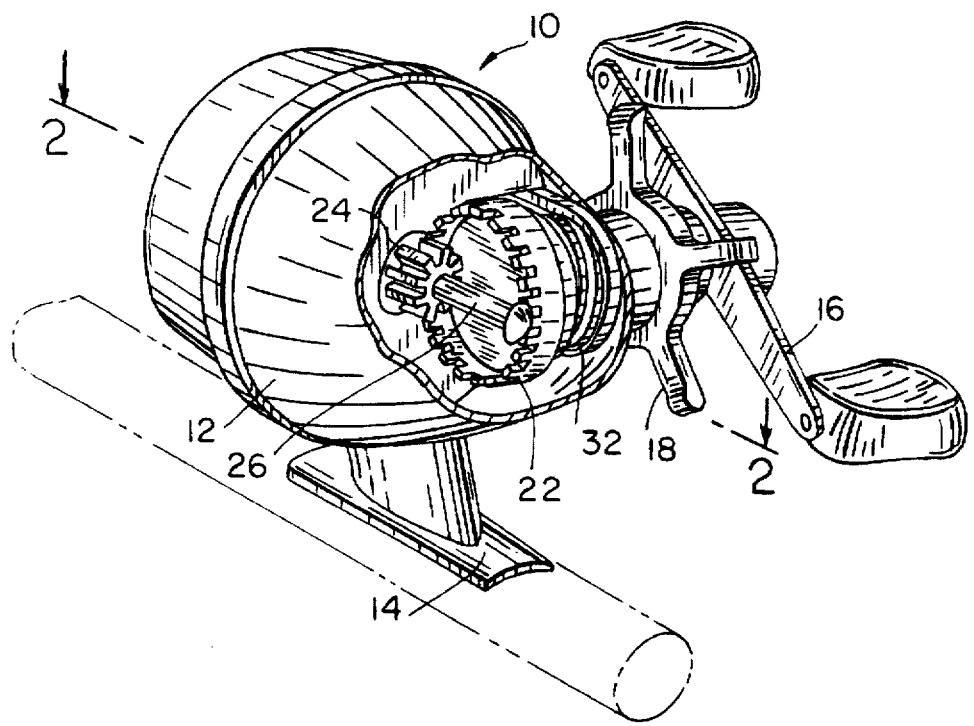
FIG. 1 is a perspective view of the fishing reel incorporating an exemplary drag mechanism.
Figure 3:
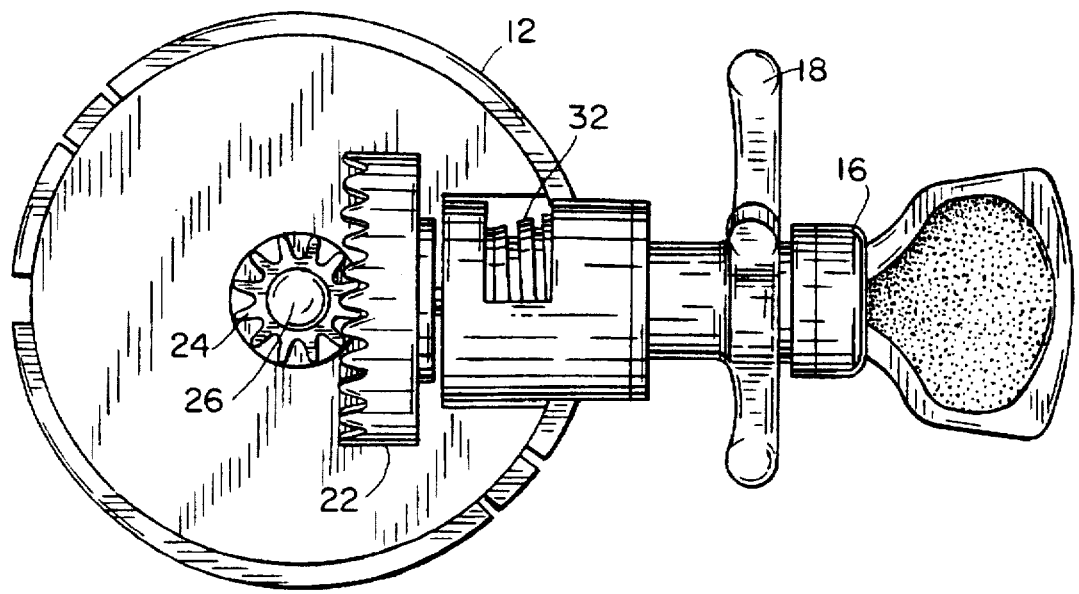
FIG. 3 is a partial end view of the fishing reel of FIG. 1.

Referring to FIG. 1, a spin casting reel 10 is shown which incorporates an exemplary drag mechanism. The spin casting reel 10 is enclosed in a housing 12 which is supported from a fishing pole on a foot 14. The fishing line is dispensed and retrieved from the spool of the reel through a hole provided at the center of the end of the housing not shown in FIG. 1. A portion of the housing 12 is broken away to show a portion of the reel drive mechanism and of the drag mechanism of this invention. The drive mechanism is operated by handle 16, while the drag mechanism is operated by the star wheel 18.

Referring to both FIGS. 1 and 2, the handle 16 is connected for rotation with a first end of shaft 20, the other end of which shaft supports a drive gear 22. The drive gear 22 engages a driven gear 24 which is in turn connected to rotate with a shaft 26 which in turn causes rotation of a mechanism to wind line on a spool 28.

Figure 5:
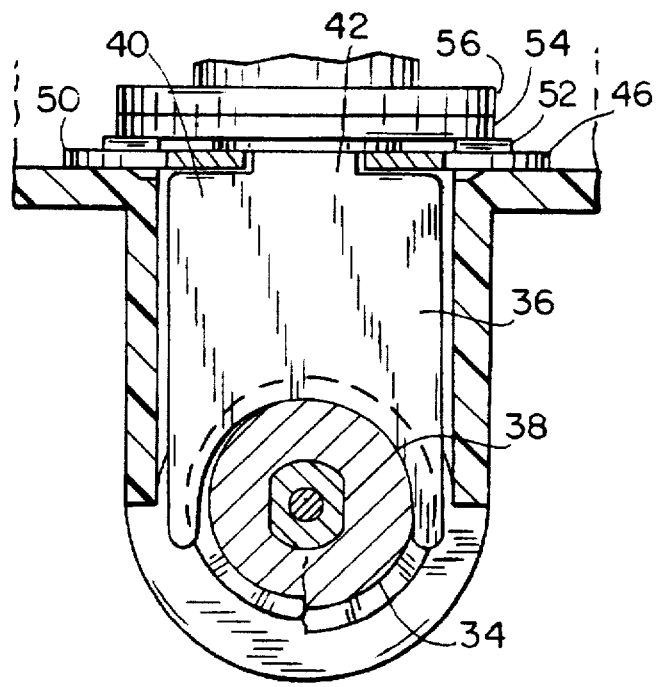
FIG. 5 is a partial cross-sectional view taken along a line 5—5 in FIG. 4.

The drag mechanism in accordance with this invention is actuated by the star wheel 18 which is keyed to rotate a hollow shaft 30, which surrounds shaft 20. Secured for rotation with hollow shaft 30 is a rotatable cam or drag gear 32, cross-sectional views of which are shown in FIGS. 2 and 7. The drag gear 32 is in the form of a truncated conical member having a helical groove 34, the radius of the base of which groove becomes increasingly smaller from right to left as viewed in FIGS. 2, 3, 6 and 7. In particular, as best illustrated in FIG. 7, along the length L of gear 32, the distance r between the base of groove 34 and the axis of gear 32, designated by the reference nuberal 35, changes. One end of a cam follower or drag adjustment plate 36 rides in the groove 34 of the drag gear or rotatable cam 32. End 38 of drag adjustment plate 36 which rides in the groove 34 is formed with a semi-circular shape as shown in FIG. 5. The opposite end 40 of drag adjustment plate 36 is provided with a tab 42 which is engaged in a notch 44 in a lever arm or drag plate 46.

Figure 4:
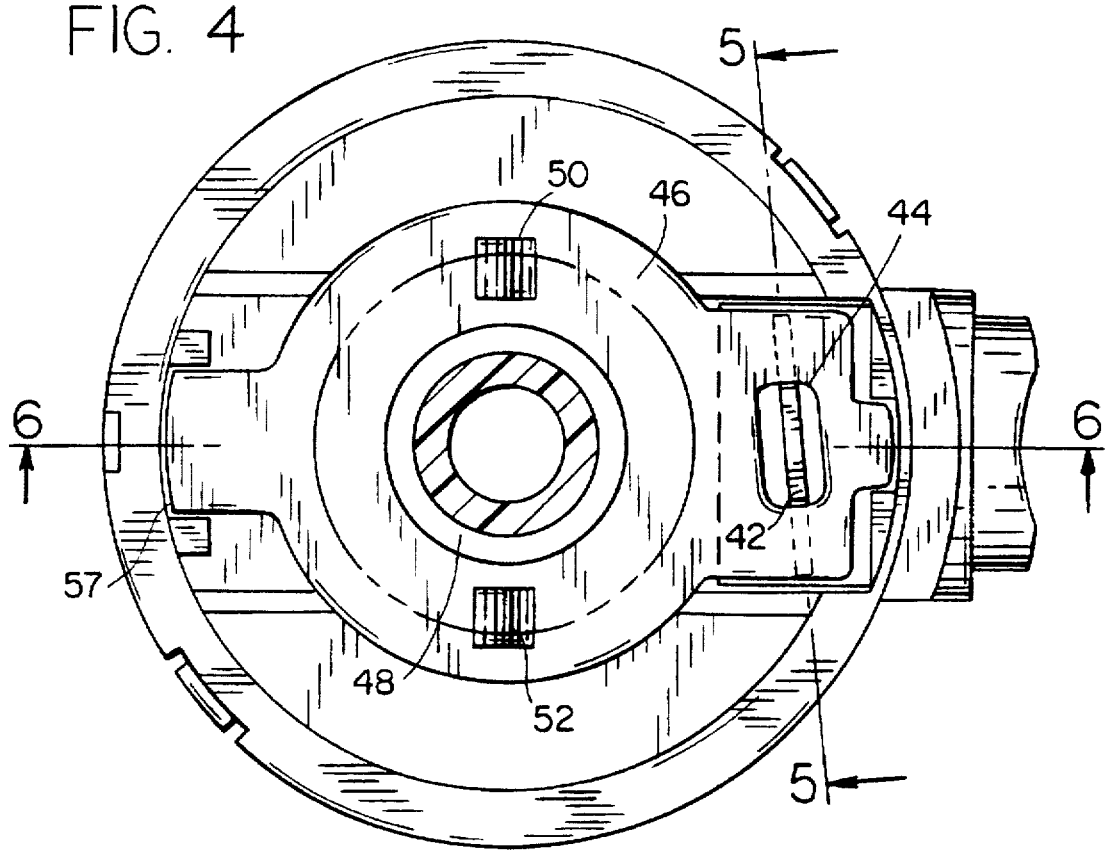
FIG. 4 is a partial cross-sectional view taken along the line 4—4 in FIG. 2 showing the drag cam of the drag mechanism.

Referring to FIGS. 2 and 4, the drag plate 46 is provided with a central aperture 48 through which shaft 26 passes. A pair of projections or embossments 50 and 52 are formed in the drag plate 46 along a diameter of the aperture 48 that is perpendicular to that passing through the notch 44. The embossments 50 and 52 are positioned adjacent a friction or braking washer 54 of a pair of braking washers 54 and 56. A second pair of braking washers, 58 and 60 is positioned on the opposite side of the spool 28.

As the star wheel 18 is rotated in the clockwise direction as viewed from the right in FIG. 2, the semicircular end 38 of the drag adjustment plate 36 is lifted away from the center of shaft 30 by the increasing radius of the base of groove 34, such that the right end of the drag plate 46, as viewed in FIG. 2, is raised. Raising the right end of the drag plate 46 causes its left end 57 to bear on a portion 59 of the housing 12, thereby raising the embossments 50 and 52 into engagement with the friction washer 54. Since friction washer 58 lays against a fixed portion 62 of the housing, the pressure of friction washers 56 and 60 against spool 28 causes a braking or drag force to be applied thereto.

Thus, by rotating the star wheel 18, the drag gear 32 can be rotated clockwise or counterclockwise so as to increase or decrease respectively the drag force applied to the friction washers 54, 56, 58 and 60 by the drag plate 46 through the embossments 50 and 52.

The drag mechanism in accordance with this invention also includes a mechanism to provide a clicking and detent action which the operator will feel as well as hear when rotating the drag wheel. Referring particularly to FIGS. 2 and 8, the portion of the drag mechanism hollow shaft 30 which is intersected by the cross-sectional line 8—8 in FIG. 2 is provided with a toothed outer periphery as shown in FIG. 8. Teeth 63 and valleys 64 are equally spaced around the circumference of the shaft. As shown in FIG. 8, the wall of the housing 12 is provided with an annular projection 66 and a pair of concentric C-shaped projections 68 within the annular projection 66, surrounding the portion of the shaft 30 provided with the teeth 63 and valleys 64. Located within an annular groove 70 formed between the C-shaped projections 68 and the annular projection 66 is a C-shaped spring 72, provided with inwardly projecting U-shaped projections 74 and 76 at each end. The spring 72, which in the preferred embodiment is formed of flat rectangular spring material, is formed such that the curved bases of the U-shaped projections 74 and 76 forcefully engaged the sides of the teeth 63 adjacent to valleys 64. Thus, as the star wheel 18 is rotated to rotate the shaft 30, the U-shaped projections 74 and 76 will snap in and out of the valleys between the teeth 63, thus providing an audible click and a positive detent action to indicate the rotation of the shaft 30, and to hold the shaft in a desired position when rotation of the star wheel 18 is terminated.

While one embodiment of the invention has been shown, it should be apparent to those skilled in the art that what has been described is considered at present to be a preferred embodiment of the drag mechanism for a spin casting reel of this invention. In accordance with the Patent Statute, changes may be made in the drag mechanism without actually departing from the true spirit and scope of this invention. The appended claims are intended to cover all such changes and modification which fall in the true spirit and scope of this invention.

What is claimed is:

1. A drag mechanism for a spin casting reel, having a frame upon which is supported a spool for rotation, comprising, a rotatable cam having an axially extending spiral groove formed therein, a radial depth of said groove changing from one end of said groove to the other, a manually rotatable member supported on the frame for rotating said rotatable cam, a cam follower, having first and second ends, said first end of said cam follower resting in said groove, said second end of said cam follower projecting radially away from said rotatable cam, at least one braking element supported on the frame, coaxial with the spool, for applying a braking force to the spool when a braking force is applied thereto, and a lever arm having first and second ends, said first end of said lever arm pivotally supported on the frame, said second end of said lever arm engaged by said second end of said cam follower, whereby when said manually rotatable member is rotated in a direction to move said cam follower radially outwardly, said second end of said lever arm is moved in a direction to pivot said lever arm about said first end to cause said lever arm to apply a braking force to said at least one braking element so as to apply a braking force to the spool.

2. The drag mechanism for a spin casting reel of claim 1, wherein said manually rotatable member is a star wheel.

3. The drag mechanism for a spin casting reel of claim 1, wherein a midportion of said lever arm is provided with projections for applying braking force to said at least one braking element in a direction colinear with the axis of the spool.

4. The drag mechanism for a spin casting reel of claim 1, including a rotatable detent member, rotatable with said manually rotatable member, having an outer circumference formed with teeth and intervening valleys, and a resilient member supported on the frame adjacent said teeth and intervening valleys, said resilient member having at least one portion positioned to be maintained in contact with said teeth, whereby as said manually rotatable member is rotated, said at least one portion of said resilient member alternately passes over a tooth and falls into a valley, thereby providing a detent action and a clicking sound when said manually rotatable member is rotated.

5. The drag mechanism for a spin casting reel of claim 4, wherein said at least one portion of said resilient member rests in one of said valleys when said manually rotatable member is not being rotated so as to maintain said rotatable cam in the position to which it was rotated by the turning of said manually rotatable member.

6. The drag mechanism for a spin casting reel of claim 4, wherein said resilient member is C-shaped, with each end portion positioned to be maintained in one of said valleys in contact with said teeth on each side of said valley.

7. The drag mechanism for a spin casting reel of claim 6, wherein each end portion is provided with a U-shaped inwardly projecting portion, with the base of each of said U-shaped portions being maintained in one of said valleys in contact with said teeth on each side of said valley.

8. The drag mechanism for a spin casting reel of claim 4, which said manually rotatable member and said rotatable cam are connected by a shaft.

9. The drag mechanism for a spin casting reel of claim 8, wherein said rotatable detent member is formed as a part of said shaft.

10. A drag mechanism for a spin casting reel having a frame which supports a spool and a driven shaft coaxial therewith, the driven shaft having a gear mounted thereon for mating with a drive gear mounted on a drive shaft perpendicular to the driven shaft, which drive shaft is also supported by the frame and has an operating handle mounted thereon for rotating a mechanism which winds line onto said spool, comprising, a hollow drive shaft surrounding said drive shaft, an operating wheel secured to one end of said hollow drive shaft adjacent the operating handle for rotating said hollow drive shaft, a rotatable cam having an axially extending spiral groove therein, the radial depth of said groove increasing from one axial end to the other, said cam being coaxial with and rotatable with said hollow drive shaft, a cam follower having first and second ends, said first end of said cam follower resting in said groove, said second end of said cam follower projecting radially away from said hollow drive shaft, braking disks associated with the spool, said braking disks being coaxial with the spool and applying a braking force to the spool when an axial braking force is applied to said braking disks, forcing said braking disks into engagement with each other, a lever arm having first and second ends, and a hole therebetween through which passes the driven shaft, said first end of said lever arm pivotally supported on the frame, said second end of said lever arm engaged by said second end of said cam follower, whereby when said operating wheel is rotated in a direction to move said cam follower radially outward from said hollow drive shaft, said second end of said lever arm is moved in a direction to pivot said lever arm about said first end to move said lever arm toward the spool to apply an axial braking force to said braking disks so as to apply a braking force to the spool.

11. The drag mechanism for a spin casting reel of claim 10, wherein said manually rotatable member is a star wheel.

12. The drag mechanism for a spin casting reel of claim 10, wherein a portion of the outer circumference of said hollow drive shaft is formed with spaced teeth and intervening valleys, and a resilient member is supported on the frame adjacent said teeth, with at least one portion positioned to be maintained in contact with said teeth, whereby as said hollow shaft is rotated by turning said operating wheel, said at least one portion of said resilient member alternately passes over a tooth and falls into a valley, thereby providing a detent action and a clicking sound when said operating wheel is rotated.

13. The drag mechanism for a spin casting reel of claim 12, wherein said at least one portion of said resilient member rests in one of said valleys when said operating wheel is not being rotated so as to maintain said hollow drive shaft in the position to which it was rotated by the turning of said operation wheel.

14. The drag mechanism for a spin casting reel of claim 12, wherein said resilient member is C-shaped, with each end portion positioned to be maintained in one of said valleys in contact with said teeth on each side of said valley.

15. The drag mechanism for a spin casting reel of claim 14, wherein each end portion is provided with a U-shaped inwardly projecting portion, with the base of each of said U-shaped portions being the are formed in each end portion, with the base of each of said U-shaped portions being maintained in one of said valleys in contact with said teeth on each side of said valley.

16. A spin cast reel comprising:

a reel frame;

a rotatable line storage spool mounted on the reel frame for storing and paying out line;

a drive mechanism for selectively driving a winding mechanism which winds line onto the spool ; and a drag mechanism for modulating rotation of the spool in response to a tensile force on the line, the drag mechanism including a rotary member and a follower, the rotary member having a rotary axis and an axially extending screw thread formed about the rotary axis, the screw thread having a predetermined length and a base which spaced from the rotary axis a varying distance along the length of the screw thread, the follower riding in the thread and exerting a variable drag force which is transmitted to the spool in response to rotation of the rotary member.

17. The reel of claim 16, wherein the drag mechanism further includes a drag plate, the follower extending between the rotary member and the drag plate, the drag plate contacting the spool to exert the drag force thereon in response to rotation of the rotary member.

18. The reel of claim 16, wherein the follower contacts the base of the thread.

19. The reel of claim 16, wherein the drive mechanism includes a crank, a crank shaft and gearing, the crank shaft being coupled to the crank for rotating the gearing and thereby driving the winding mechanism in rotation upon selective actuation of the crank.

20. The reel of claim 19, wherein the rotary member is disposed around the crank shaft.

* * * * *